United States Patent [19]
Martyashin et al.

[11] 3,840,805
[45] Oct. 8, 1974

[54] DEVICE FOR MEASURING PARAMETERS OF RESONANT LC-CIRCUIT

[76] Inventors: Alexandr Ivanovich Martyashin, ulitsa Kirova, 69, kv. 59; Andrei Elizarovich Morozov, ulitsa Uritskogo 44/10, kv. 62; Eduard Konstantinovich Shakhov, ulitsa Gladkova, 13, kv. 5; Viktor Mikhailovich Shlyandin, ulitsa Lermontova, 12, kv. 17, all of Penza, U.S.S.R.

[22] Filed: June 1, 1973

[21] Appl. No.: 366,208

[52] U.S. Cl................ 324/57 Q, 330/28, 330/107, 330/109
[51] Int. Cl............................................. G01r 27/00
[58] Field of Search........ 324/57 Q; 330/28, 31, 75, 330/107, 109

[56] References Cited
UNITED STATES PATENTS

| | | | |
|---|---|---|---|
| 1,788,714 | 1/1931 | Grimley | 330/109 X |
| 2,017,112 | 10/1935 | Wehnert | 330/109 X |
| 2,178,072 | 10/1939 | Fritzinger | 330/107 X |
| 2,459,046 | 1/1949 | Rieke | 330/109 |
| 2,523,403 | 9/1950 | Van Loon | 330/107 X |
| 2,811,591 | 10/1957 | Kennedy | 330/107 |
| 3,120,616 | 2/1964 | Ishimoto et al. | 330/28 X |
| 3,239,770 | 3/1966 | Taber | 330/31 X |
| 3,423,690 | 1/1969 | Hirst | 330/109 |
| 3,436,675 | 4/1969 | Lunau | 330/109 X |

*Primary Examiner*—Stanley T. Krawczewicz
*Attorney, Agent, or Firm*—Eric H. Waters

[57] ABSTRACT

A device for measuring the parameters of a resonant LC circuit. The device includes a D.C. amplifier with a parallel negative feedback whose circuit includes a reference element or parallel LC-elements of a resonent LC-circuit. Connected to the input of the amplifier via series-connected LC-elements of the resonant LC-circuit or reference element is a reference voltage pickup. Connected to the output of the amplifier are amplitude and frequency measuring units whose output signals are used to determine the parameters of the resonant LC-circuit elements.

8 Claims, 6 Drawing Figures

DEVICE FOR MEASURING PARAMETERS OF RESONANT LC-CIRCUIT

The present invention relates to the field of electric measurements, and more particularly to devices for measuring the parameters of resonant LC-circuits.

The herein disclosed device for measuring the parameters of a resonant LC-circuit is employed mainly for measuring the parameters of resonant LC-circuits incorporated in various radioelectronic devices, as well as for measuring signals of various LC-transducers, sensors and microsensors.

No similar device for measuring the parameters of a resonant LC-circuit has been hitherto known.

It is an object of the present invention to provide a device for measuring the parameters of a resonant LC-circuit within a relatively short time interval and to a high accuracy.

This object is attained in a device, for measuring the parameters of a resonant LC-circuit, comprising, according to the invention, a DC amplifier with a parallel negative feedback whose circuit includes a reference element or parallel LC-elements of the resonant LC-circuit, a reference voltage pickup whose output is connected via series-connected LC-elements of the resonant LC-circuit, or reference element, to the input or the DC amplifier, as well as an amplitude measuring unit and a frequency measuring unit both connected to the output of the DC amplifier, their output signals determining the parameters of the resonant LC-circuit.

It is preferred that a resistor be used as the reference element included in the parallel negative feedback circuit of the DC amplifier.

It is more preferred that a capacitor be used as the reference element included in the parallel negative feedback circuit of the DC amplifier.

It is still more preferred that an inductance coil be used as the reference element included in the parallel negative feedback circuit of the DC amplifier.

It is also advantageous that the reference element through the medium of which the output of the reference voltage pickup is connected to the input of the DC amplifier, be a resistor.

It is more advantageous that the reference element through the medium of which the output of the reference voltage pickup is connected to the input of the DC amplifier, be a capacitor.

It is still more advantageous that the reference element, through the medium of which the output of the reference voltage pickup is connected to the input of the DC amplifier, be an inductance coil.

The proposed device makes it possible to measure the parameters of a resonant LC-circuit within a short time interval and to a high accuracy, the device being simple in design and small in size.

A fuller understanding of the nature and objects of the invention will be had from the following detailed description of embodiments thereof taken in conjunction with the accompanying drawings, wherein.

Figure 1:
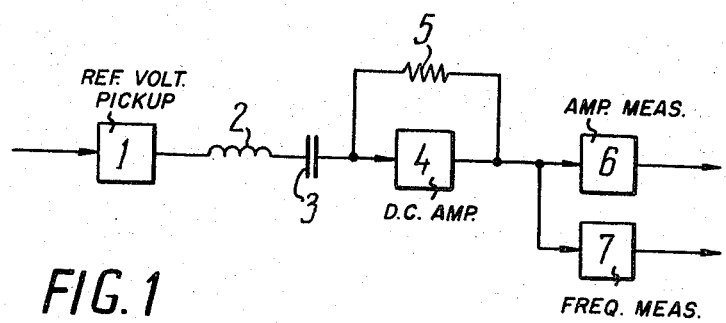
FIG. 1 is a block diagram of the first embodiment of a device for measuring the parameters of a resonant LC-circuit, according to the invention.

Referring now to the drawings, the proposed device for measuring the parameters of a resonant LC-circuit comprises a reference voltage pickup 1 (FIG. 1) started by a signal from an external source (not shown). The pickup 1 uses a conventional transistor circuit. The output of the reference voltage pickup 1 is connected via an inductance coil 2 and a capacitor 3, both connected in series, of the resonant LC-circuit to the input of a DC amplifier 4 with a parallel negative feedback whose circuit includes a reference element which, in this particular embodiment, is a resistor 5. The DC amplifier 4 uses an integrated microcircuit.

The output of the DC amplifier 4 is connected to the input of an amplitude measuring unit 6 which, in this embodiment, is a digital peak voltmeter using a conventional transistor circuit, and to the input of a frequency measuring unit 7 which, in this embodiment, is a digital frequency meter also using a conventional transistor circuit.

Figure 2:
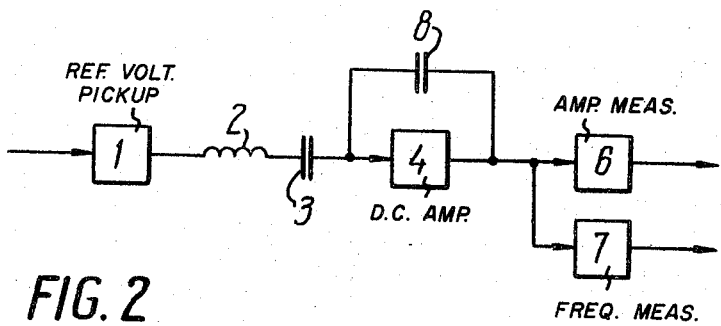
FIG. 2 is a block diagram of the second embodiment of the novel device.

The difference, in FIG. 2, is that the reference element included in the negative feedback circuit of the DC amplifier 4, is a capacitor 8.

Figure 3:
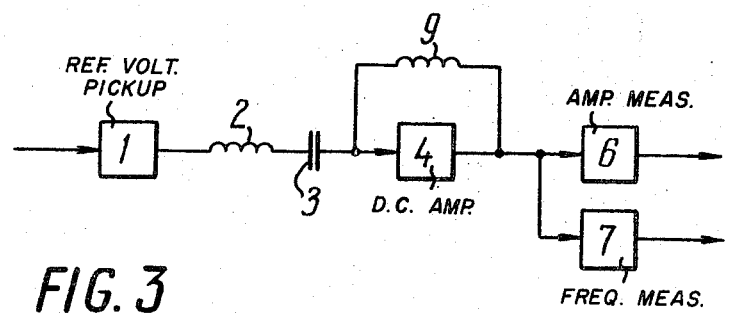
FIg. 3 is a block diagram of the third embodiment of the novel device.

In FIG. 3, as distinct from the above embodiment, the reference element in the parallel negative feedback circuit of the DC amplifier 4, is an inductance coil 9.

A fourth embodiment, similar to the above embodiment of the novel device for measuring the parameters of a resonant LC-circuit, is possible.

Figure 4:
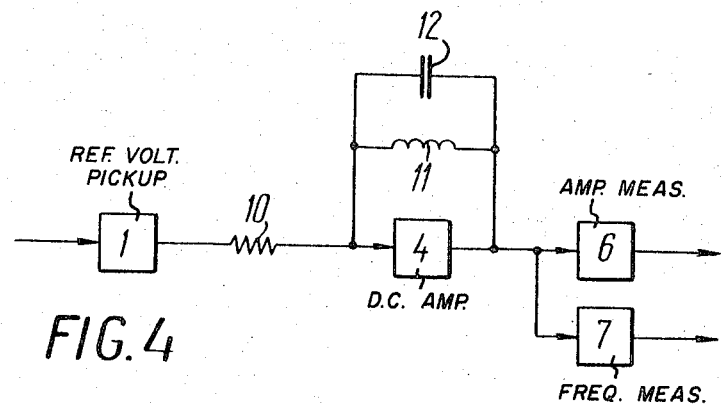
FIG. 4 is a block diagram of the fourth embodiment of the novel device.

It is different from the above embodiment in that the output of the reference voltage pickup 1 (FIG. 4) is connected to the input of the DC amplifier 4 via a resistor 10, and the parallel negative feedback circuit of the DC amplifier 4 includes an inductance coil 11 of the resonant LC-circuit and a capacitor 12 of the latter, both connected in parallel.

There may be yet another embodiment of the novel device for measuring the parameters of a resonant LC-circuit, similar to the one described above.

Figure 5:
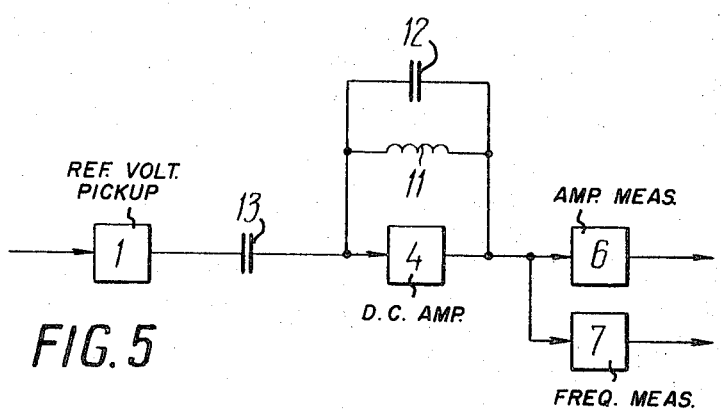
FIG. 5 is a block diagram of the fifth embodiment of the novel device.

Its distinctive feature resides in that the output of the reference voltage pickup 1 (FIG. 5) is connected to the input of the DC amplifier 4 via a capacitor 13, and the parallel negative feedback circuit of the DC amplifier 4 includes the inductance coil 11 of the resonant LC-circuit, placed in parallel with the capacitor 12 of the latter.

Finally, a sixth embodiment, similar to the above embodiment of the novel device for measuring the parameters of a resonant LC-circuit, is also possible.

Figure 6:
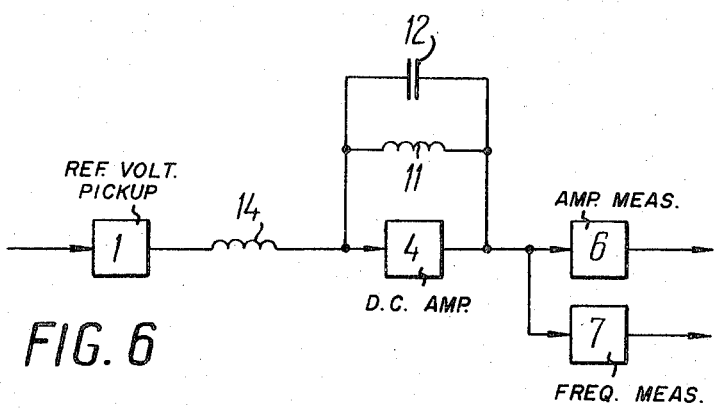
FIG. 6 is a block diagram of the sixth embodiment of the novel device.

It differs from the above embodiment in that the output of the reference voltage pickup 1 (FIG. 6) is connected to the input of the DC amplifier 4 via an inductance coil 14, and the parallel negative feedback circuit of the DC amplifier 4 includes the inductance coil 11 of the resonant LC-circuit connected in parallel with the capacitor 12 of the latter.

The novel device for measuring the parameters of a resonant LC-circuit operates as follows.

A signal from an external source starts the reference voltage pickup 1 (FIG. 1) from the output whereof a DC voltage $E_o$ is applied to the series-connected inductance coil 2 and capacitor 3 of the resonant LC-circuit.

An AC voltage appears therewith across the output of the DC amplifier 4 whose parallel negative feedback circuit includes the resistor 5 having a resistance value $R_o$, the amplitude and frequency of which voltage are measured by the amplitude measuring unit 6 and the frequency measuring unit 7, respectively.

The values of the amplitude A and the frequency F of the output voltage of the DC amplifier 4, measured in the above-described manner, are unambiguously representative of the value of the characteristic resistance $\rho = \sqrt{L/C}$ of the resonant LC-circuit, as well as of the value of the natural resonance frequency $f = 1/2\pi \sqrt{LC}$ of this circuit:

$$A = E_o \cdot R_o/\rho;$$
$$F = f.$$

The second embodiment of the novel device for measuring the parameters of a resonant LC-circuit operates in a manner similar to the embodiment described herein above.

The only difference in this case is that due to the introduction of the capacitor 8 having a capacitance value $C_o$ into the parallel negative feedback circuit of the DC amplifier 4 (FIG. 2), the measured values of the amplitude A and the frequency F of the output AC voltage of the DC amplifier 4 are unambiguously representative of the value of the capacitance C of the resonant LC-circuit, as well as of the value of the natural resonance frequency f of this circuit:

$$A = E_o \cdot C/C_o\ ;$$
$$F = f.$$

The operation of the third embodiment of the novel device for measuring the parameters of a resonant LC-circuit is also similar to that of the above-described embodiment.

Here the difference is that due to the introduction of the inductance coil 9 having an inductance value $L_o$ into the parallel negative feedback circuit of the DC amplifier 4 (FIG. 3), the measured values of the amplitude A and the frequency F of the output AC voltage of the DC amplifier 4 are unambiguously representative of the value of the inductance L of the resonant LC-circuit, as well as of the natural resonance frequency f of this circuit:

$$A = E_o \cdot L_o/L;$$
$$F = f.$$

The fourth embodiment of the novel device for measuring the parameters of a resonant LC-circuit operates in much the same way as the above-described embodiment.

The only difference in this case is that due to the application of the voltage $E_o$ from the output of the reference voltage pickup 1 (FIG. 4) to the resistor 10 with the resistance $R_o$ and due to the introduction of the paralleled inductance coil 11 and capacitor 12 of the resonant LC-circuit into the parallel negative feedback circuit of the DC amplifier 4, the measured values of the amplitude A and the frequency F of the output AC voltage of the DC amplifier 4 are unambiguously representative of the value of the characteristic resistance $\rho = \sqrt{L/C}$ of the resonant LC-circuit, as well as of the natural resonance frequency $f = 1/2\pi \sqrt{LC}$ of this circuit:

$$A = E_o/R_o \cdot \rho;$$
$$F = f.$$

The fifth embodiment of the novel device for measuring the parameters of a resonant LC-circuit operates just like the foregoing embodiment thereof.

There is a difference however, and it resides in that due to the application of the voltage $E_o$ from the output of the reference voltage pickup 1 (FIG. 5) to the capacitor 13 with the capacitance $C_o$ and due to the introduction of the paralleled inductance coil 11 and capacitor 12 of the resonant LC-circuit into the parallel negative feedback circuit of the DC amplifier 4, the measured values of the amplitude A and the frequency F of the output AC voltage of the DC amplifier 4 are unambiguously representative of the value of the capacitance C of the resonant LC-circuit, as well as of the natural resonance frequency f of this circuit:

$$A = E_o \cdot C_o/C;$$
$$F = f.$$

The operation of the sixth embodiment of the novel device for measuring the parameters of a resonant LC-circuit is similar to that of the above embodiment.

The only difference in this case is that due to the application of the voltage $E_o$ from the output of the reference voltage pickup 1 (FIG. 6) to the inductance coil 14 with the inductance $L_o$ and due to the introduction of the paralleled inductance coil 11 and capacitor 12 of the resonant LC-circuit into the parallel negative feedback circuit of the DC amplifier 4, the measured values of the amplitude A and the frequency F of the output AC voltage of the DC amplifier 4 are unambiguously representative of the value of the inductance L of the resonant LC-circuit, as well as of the natural resonance frequency f of this circuit:

$$A = E_o \cdot L/L_o;$$
$$F = f.$$

The herein-disclosed device for measuring the parameters of a resonant LC-circuit features fast response, a broad variety of practical applications and a high accuracy of measurement.

When measuring the parameters of individual LC-elements, the herein-disclosed device enables to perform the measurement to a high degree of accuracy owing to the elimination of the errors of conversion introduced by the presence of stray capacitance in the inductance coils and stray inductance in the capacitors.

The novel device for measuring the parameters of a resonant LC-circuit is characterized by simple design and compact size.

As to how electrical oscillations appear at the output of DC amplifier 4 and how the frequency of these oscillations is measured, it will be noted that, after reference voltage pickup 1 is driven by an external signal, DC voltage $E_o$ appears at its output, i.e., the voltage at the output of references voltage pickup 1 at the starting moment increases in a jump from zero to voltage $E_o$ and thereafter said voltage is varied. The reaction of DC amplifier 4 locked in by a parallel negative feedback to the jump-type drive effect consists of sine wave electrical oscillations which appear at its output. Since the output of DC amplifier 4 is connected to the input of frequency measuring unit 7, after the electrical oscillations are generated, said unit 7 at once measures their frequency.

All the devices 1, 4, 6 and 7 are known in the prior art and they are, for example, described in the following publications:

a. reference voltage pickup 1 in "Automatic Monitoring of Electronic and Electric Equipment" by B. M. Shlandin and A. I. Martiashin; publishing house "Energy" Moscow, 1972, p. 223, FIG. 5.21.

b. frequency measuring unit 7 is described by R. S. Ermolov in "Digital Frequency Meters," publishing house "Energy," Leningrad Division, 1973, signed for printing on Feb. 12, 1973, p. 19, FIG. 1-10.

c. DC amplifier 4 is described by B. M. Shlandin, "Digital Measuring converters and Instruments," publishing house "High School," Moscow 1973, signed for printing on Oct. 24, 1972, p. 106, FIG. 2.35.

d. amplitude measuring unit 6 is described in "Information and Measurement Equipment," volume 5. Science Proceedings, Pensa, 1971, p. 74, FIG. 1.

What is claimed is:

1. A device for measuring the parameters of a resonant LC-circuit including series-connected elements, said device comprising a DC amplifier including parallel negative feedback means including a reference element connected in negative feedback relation with said amplifier; said amplifier including an input and output; a reference voltage pickup including an output connected via said series-connected LC-elements of the resonant LC-circuit to the input of said DC amplifier; an amplitude measuring means connected to the output of said amplifier; and a frequency measuring means connected to the output of said amplifier, the output signals of the frequency measuring means together with those of said amplitude measuring means determining the parameters of the resonant LC-circuit.

2. A device as claimed in claim 1, wherein said reference element is a resistor.

3. A device as claimed in claim 1 wherein said reference element is a capacitor.

4. A device as claimed in claim 1 wherein said reference element is an inductance coil.

5. A device for measuring the parameters of a resonant LC-circuit including parallel LC-elements, said device comprising a DC amplifier including parallel negative feedback means including the parallel LC-elements of the resonant LC-circuit; said amplifier including an input and an output; a reference voltage pickup for being electrically connected to the input of said DC amplifier; a reference element connecting said amplifier to said reference voltage pickup; an amplitude measuring units connected to the output of said amplifier; a frequency measuring means also connected to the output of said amplifier, the output signals of said frequency measuring means with those of said amplitude measuring means determining the parameters of the resonant LC-circuit.

6. A device as claimed in claim 5, wherein said reference element is a resistor.

7. A device as claimed in claim 5, wherein said reference element is a capacitor.

8. A device as claimed in claim 5, wherein said reference element is an inductance coil.

* * * * *